3,755,573
FERTILITY CONTROL EMPLOYING QUINESTROL AND QUINGESTANOL ACETATE

Edel Berman, Morristown, N.J., assignor to Warner-Lambert Company, Morris Plains, N.J.
No Drawing. Continuation-in-part of application Ser. No. 869,934, Oct. 27, 1969, which is a continuation-in-part of application Ser. No. 596,081, Nov. 22, 1966. This application July 10, 1970, Ser. No. 54,026
Int. Cl. A61k 23/00
U.S. Cl. 424—238                1 Claim

ABSTRACT OF THE DISCLOSURE

Method for fertility control by the administration of a single dose of quinestrol, orally or by injection, at weekly or monthly intervals or at greater intervals.

---

This application for U.S. Letters Patent is a continuation-in-part of my copending U.S. Ser. No. 869,934 filed Oct. 27, 1969 which is, in turn, a continuation-in-part of U.S. application Ser. No. 596,081, filed Nov. 22, 1966, both of which are now abandoned.

The present invention relates to a novel method for fertility control in human beings by the administration at relatively widely spaced time intervals of a single fertility inhibiting dose of quinestrol, the cyclopentyl ether of 17α-ethynyl estradiol.

As is well known, two hormones secreted by the anterior pituitary gland control the menstrual cycle. The action of the follicle-stimulating hormone first causes the growth of graafian follicles in the ovary. Some days later increased secretion of the luteinising hormone causes ovulation to occur and stimulates the formation of the corpus luteum in the follicle. During the first half of the cycle estrogen is secreted by the ovary. This hormone causes re-growth of the endometrium. After ovulation occurs a second ovarian hormone, progesterone, is secreted by the corpus luteum. This hormone changes the character of the endometrium from the proliferative to the secretory phase in preparation for the embedding of a fertilized ovum. Should embedding not occur, the level of progesterone falls sharply from the 24th day and withdrawal bleeding and shedding of the endometrium occurs about the 28th day. Menstruation usually occurs 14 days after ovulation so that the day of ovulation determines the length of the cycle.

The rise in the level of the ovarian hormones suppresses the production of the pituitary hormones until the 24th day, after which pituitary production rises again to repeat the cycle. The levels of the pituitary and ovarian hormones vary see-saw fashion during each cycle. The high level of ovarian hormones during pregnancy suppresses pituitary hormone secretion and so causes a temporary natural cessation of the pituitary cycle.

There are several products presently available which when taken orally on a precise schedule are effective in human beings as fertility control agents. They include "combination" products in which the dosage from utilized contains both a progestogen and an estrogen such as a mixture of norethynodrel and mestranol or a mixture of ethynodiol diacetate and mestranol. When the last dosage of the combined product is taken on about day 24, the desired cycle commences three to four days later. These antifertility agents may take the form of "sequential" products where the initial action is obtained by administration of an estrogen such as mestranol, for example, which is then followed in a precise and prescribed sequence by administration of a combination of mestranol with a progestogen such as chlormadinone acetate to effect the desired menstrual cycle.

Combination products are taken by patients under treatment on a daily basis following a recommended schedule during each cycle, the dosage form being the same as to composition and appearance on each day during the treatment period recommended. For example, with a combination product one tablet of the combined estrogen and progestogen is taken at a given time each day beginning with day 5 of the menstrual cycle and continuing for 20 to 21 days of the cycle. Shedding of the endometrium follows shortly thereafter and another cycle of treatment is undertaken on day 5 following the commencement of endometrial shedding, i.e., bleeding.

Sequential treatment is usually started several days after the cycle commences by administering the estrogenic component for the first 15 to 16 days of the treatment period and this sequence is then followed by the administration of the estrogen in combination with a progestogen for the next 5 to 6 days. Treatment is halted and endometrial shedding commences shortly thereafter.

It is obvious that the success of such therapy in controlling fertility is quite dependent upon the regularity with which the medication schedule is followed. Any omission from the prescribed schedule makes a pregnancy increasingly liable. If such therapy is given to patients with a history of irregular or short cycles the precise timing required to make this therapy effective is a definite disadvantage. The risk of pregnancy will be even greater when the effectiveness of the therapy is dependent upon a menstrual cycle which must be exactly timed.

In addition to the necessity for precise timing many undesirable side effects have been observed and reported in connection with the above therapy. For example, spotting, nausea and vomiting, breast tenderness and weight gain are the chief complaints of patients receiving this therapy. Obviously, in view of the large number of patients undergoing such treatment there is a clear need for a reliable method for the control of fertility where daily or sequential doses and the aforementioned disadvantages of precise scheduling are greatly minimized or eliminated.

Accordingly, a primary object of this invention is to provide a novel method for controlling fertility by the administration at relatively widely spaced intervals of a single dose of a fertility controlling agent consisting essentially of quinestrol with or without a progestogen.

A further object of this invention is to provide an improved method for the control of fertility which can be initiated and continued with reliable and dependable results in patients regardless of whether they have short or irregular menstrual cycles and particularly advantageous in those cases involving patients who are forgetful of their medication or are incapable for whatever reason of adhering to a precise daily schedule or are not desirous of passing through the usual menstrual cycle at regular monthly intervals.

Other objects and advantages of this invention will become apparent from the following detailed description.

According to my novel method, pregnancy can be prevented by the oral administration of the estrogen quinestrol, the cyclopentyl ether of 17α-ethynyl estradiol, at widely spaced time intervals by a dosage which is sufficient to maintain an effective fertility inhibiting level of this estrogenic compound in the system of the patient undergoing this therapy.

The administration of quinestrol in order to effect fertility control may be made at weekly, monthly or even longer intervals. When it is desired to commence treatment and thereafter maintain a weekly dosage schedule this can be undertaken satisfactorily by the oral administration to the subject of from about 0.1 mg. to about 2 mg. of quinestrol on day 1 of any normal menstrual cycle. Thereafter, on the same day of the week on which the first dose was taken, the dose is repeated and this is continued from week to week thereafter as long as fertility control is to be maintained and no intermediate menstrual cycle is experienced. If at any time a menstrual cycle is desired, and this may be at an interval of one, two or more months, a progestational dose of any known progestogen is taken either orally or parenterally and the physiological effect of the progestogen causes the endometrium to shed and the patient to bleed.

If fertility control is desired using a single monthly dose of quinestrol, from about 0.5 to about 5 mg. of quinestrol is administered orally to the subject on any day of a normal menstrual cycle even up to about day 8 and thereafter, since cycling is usually desired, a second equivalent dose of quinestrol is administered in combination with a progestogen. This is, of course, just three weeks to the day after the start of the prior cycle. To maintain fertility control this combination of quinestrol with a progestogen is continued thereafter. The interval to be chosen is somewhat flexible in that the day upon which the next dose is taken may be either the same day but four weeks after the first quinestrol and progestogen combination was taken or it may be the same calendar day of the month. If the first quinestrol-progestogen combination was taken, for example, on the fifth calendar day of the month, the next succeeding dose is also taken on the fifth calendar day of the month and continued as long as fertility control is desired.

Since the physician will initiate treatment following a normal cycle and will establish a day for the patient on which the medication is to be taken, the schedule involves only a single day which need be noted by the patient at a convenient monthly interval.

For fertility control where even greater time intervals are to be relied upon between doses, parenteral depot administration can be utilized. The depot administration of about 5 to 10 mg. of quinestrol at three month intervals or of from 10 to 20 mg. at six month intervals is feasible. At any time a normal cycle is desired, shedding of the endometrium is effected by the administration of a progestogen. Since the continued action of the quinestrol is a result of its depot effect, the interval at which the administration of the progestogen is carried out need not coincide with that of the quinestrol nor does the interval need to be the same since a cycle may be desired at more frequent intervals than the quinestrol is given.

The synthesis and related chemistry of quinestrol are described in U.S. Pat. No. 3,159,543 issued Dec. 1, 1964.

The progestogen utilized when cycling is desired may be any physiologically effective progestational agent effective by either the oral or parenteral route. Parenteral progesterone is useful but orally active agents such as norethindrone acetate, medroxy progesterone acetate, chlormadinone acetate or quingestanol acetate are preferred since they are more convenient to administer. When quingestanol acetate is the progestogen utilized, each dosage unit can be from about 0.5 mg. to about 10 mg. but the total dose administered must be sufficient to cycle and is preferably about 5 mg. which can be administered as a single dose or can be divided into two or three units for administration in a daily sequence at the time cycling is desired.

The above described methods possess pronounced advantages over methods heretofore known because patients under this therapy need only take the medication once a week or once a month after therapy has been initiated in the manner described. Furthermore, because of the lower doses given, the side effects commonly accompanying previously described fertility control therapies are significantly reduced.

As suitable pharmaceutical dosage forms for use in connection with the practice of the fertility control method of this invention, both the quinestrol and progestogen may be dissolved in an inert solvent including a vegetable oil such as peanut oil, sesame oil and the like and the oil solution obtained then dispensed in the form of soft gelatin capsules which are merely swallowed with the aid of some water, for example. They may also be combined with suitable pharmaceutically inert diluents such as dicalcium phosphate and lactose which is processed to form a granulation for tableting and the granulation then compressed into tablets according to processes well-known to the pharmaceutical art.

The following examples are included in order further to illustrate the invention.

EXAMPLE 1

A group of 15 female patients who were known to be regularly menstruating and to be nonpregnant were started with an oral dose of 2 mg. of quinestrol in sesame oil on day 5 of a normal menstrual cycle and this 2 mg. dose was given three times at weekly intervals, the dose being given each time on the same day of the week that the initial dose was given. On the same day during the fourth week the patients were each given 2.5 mg. of quingestanol acetate. No pregnancies were reported after completion of about 60 cycles.

EXAMPLE 2

A study demonstrating the effectiveness of the one dose per month method was carried out in 60 female patients who were known to be regularly menstruating and nonpregnant, each of who had a history of at least two previous pregnancies. A combination of 2 mg. of quinestrol and 5 mg. of quingestanol acetate was given to each patient on day 22 after the first day of menstruation and no other medication or other form of contraception was utilized. On the same day as the initial dose was given but four weeks later each patient was given the same combination of quinestrol and quingestanol acetate. This was repeated in each patient for a combined total of at least 300 menstrual cycles for the combined group of 60. No pregnancy was reported in any of the patients remaining on the medication.

EXAMPLE 3

A single 5 mg. of dose of quinestrol was given to female patients on day 5 of the menstrual cycle. Second and subsequent doses of the same were given at 28 day intervals thereafter. This dosage regimen was found to be effective in suppressing ovulation. Some of the results are reported in the International Journal of Fertility, April–June 1967, volume 12, No. 2, pp. 247–250 (1967).

This method of preventing pregnancies in females by the oral administration of 5 mg. of quinestrol at 28 day intervals was also concluded as being effective.

EXAMPLE 4

In a study conducted by Dr. Manuel Maqueo in Mexico City a total of 33 healthy, fertile women who did not want to become pregnant were studied using a dose of quinestrol, 2 mg. given on day 1 (the first day of bleeding) of the menstrual cycle. These women were followed for a total of 120 cycles, the longest duration of treatment in any one patient being 12 cycles. During the course of the study only one patient became pregnant, indicating that quinestrol used in this manner was a reasonably effective contraceptive drug. This is a method for preventing pregnancies in females by the oral administration of about 2 mg. of quinestrol, the interval between the doses, about 21 to 32 days, is a reasonably effective method for the prevention of pregnancies.

EXAMPLE 5

In a study of quinestrol for the prevention of pregnancy, Dr. Jeanne A. Epstein and Dr. Maria Skerlavay, (Int. J. of Fertil., vol. 12, No. 2: 247–250, Apr. 22, 1967), a single dose of 5 mg. of quinestrol was given on day 5 of the first treatment cycle. Second and third doses were given at 28 day intervals thereafter regardless of whether or not vaginal bleeding occurred in the interim. During the course of this study comprising a total of 9 cycles, it was found that ovulation was measured by basal body temperature and urinary pregnadiol values did not occur indicating that quinestrol given in this manner was effective as a contraceptive. The investigators concluded that a single 5 mg. dose of quinestrol appeared to be consistently effective in achieving suppression of ovulation. The duration of ovulation suppression after stopping the 5 mg. doses given at intervals of 28 days was more than 50 days in each of th three patients.

EXAMPLE 6

Method in accordance with the claim wherein progestagen is also employed to cause endometrial shedding. In the study by Dr. Jeanne A. Epstein and Dr. Maria Skerlavay, it is reported that menses were induced periodically with parenteral progesterone to cause endometrial shedding. In a study reported by Dr. Robert B. Greenblatt (Fertil. and Steril., vol. 18: 207–211 March-April 1967), the following progestagens were used to induce endometrial shedding following the use of or simultaneously with administration of quinestrol; chlormadinone, dydrogesterone, norgestrel, and other known progestational agents.

What is claimed is:

1. A method for preventing pregnancy in females which comprises the oral administration to said females of a sequence of separate fertility inhibiting doses of about 2 mg. of quinestrol in combination with about 2.5 mg. of quingestanol acetate, the interval between doses being about 28 days.

References Cited

Tyler, "Current Status of Oral Contraception," Jama, vol. 187, No. 8 (1964), pp. 562–565.

Falconi et al., J. of Endocrinology (1962), pp. 169–173, vol. 25.

Skerlavay et al., Int. J. Fertility, 12:247–50, April-June, 1967.

Falconi et al., Proc. Soc. Exptl. Biol. Med. 108:3–6, (1961).

ALBERT T. MEYERS, Primary Examiner

V. D. TURNER, Assistant Examiner